United States Patent

Flower et al.

[11] 3,838,924
[45] Oct. 1, 1974

[54] VECTOR VELOCIMETER (DIRECTION INDICATING VELOCIMETER)

[75] Inventors: Robert A. Flower, White Plains; George R. Gamertsfelder, Pleasantville; Gus Stavis, Croton-on-Hudson, all of N.Y.

[73] Assignee: Singer-General Precision, Inc., Little Falls, N.J.

[22] Filed: June 16, 1972

[21] Appl. No.: 263,489

Related U.S. Application Data

[63] Continuation of Ser. No. 86,897, Nov. 4, 1970, abandoned.

[52] U.S. Cl. ................. 356/28, 356/167, 250/237 G
[51] Int. Cl. .............................................. G01p 3/36
[58] Field of Search .............. 356/28, 167; 350/285; 250/237 G; 343/9

[56] References Cited
UNITED STATES PATENTS

| | | | |
|---|---|---|---|
| 2,772,479 | 12/1956 | Doyle | 356/28 |
| 2,942,119 | 6/1960 | King et al. | 356/28 |
| 3,016,464 | 1/1962 | Bailey | 356/167 |
| 3,432,237 | 3/1969 | Flower et al. | 356/28 |
| 3,511,150 | 5/1970 | Whitney et al. | 356/28 |
| 3,573,849 | 4/1971 | Herriot et al. | 250/237 G |
| 3,711,200 | 1/1973 | Maughmer | 356/28 |

*Primary Examiner*—Maynard R. Wilbur
*Assistant Examiner*—S. C. Buczinski
*Attorney, Agent, or Firm*—T. W. Kennedy

[57] ABSTRACT

A source of radiation such as a laser directs a substantially monochromatic beam towards a reference surface. An optical grating located near the source, in conjunction with a photodetector, transforms the reflected radiation into an electrical signal. A standard frequency is generated internally of the device and is compared, by suitable circuitry, with the frequency obtained from the reflected radiation. Positive and negative values are obtained for the velocity components from the comparison of these two signals. Additionally, the existence of this internal standard permits the measurement of zero and near-zero velocity.

11 Claims, 10 Drawing Figures

INVENTORS
GEORGE R. GAMERTSFELDER
ROBERT A. FLOWER &
GUS STAVIS

INVENTORS
GEORGE R. GAMERTSFELDER
ROBERT A. FLOWER &
GUS STAVIS

INVENTORS
GEORGE R. GAMERTSFELDER
ROBERT A. FLOWER &
GUS STAVIS

BY Thomas W. Kennedy
ATTORNEY

VECTOR VELOCIMETER (DIRECTION INDICATING VELOCIMETER)

This is a continuation of application Ser. No. 86,897 filed Nov. 4, 1970 now abandoned.

BACKGROUND OF THE INVENTION

1. Field of the Invention

This invention relates to velocity measuring devices and more particularly to a device in which a frequency characteristic proportional to the relative velocity and direction between a body and a target is derived from wave radiation projected from the body to the target, reflected therefrom, and returned to the projecting body.

2. Description of the Prior Art

The measurement of the relative velocity between two objects without any physical contact between them is frequently desirable. Various devices using different portions of the electromagnetic spectrum to accomplish this purpose have been devised. Most of these devices have been either costly or impractical. Others have lacked either zero or near-zero indicating capability or have given the magnitude but not the direction of the velocity vector. An example of this latter type of device is the velocity measuring device disclosed in the patent to Flower et al. U.S. Pat. No. 3,432,237 which issued Mar. 11, 1969.

Where ground contact is impossible, such as with hovercraft, aircraft or spacecraft, noncontact velocimeters find particular applicability. Additionally, with the so-called all-terrain vehicles, due to the nature of the terrain over which they may be traveling, a fifth wheel speedometer may be impractical. Further, measurement of the speed of materials passing a fixed point lends itself particularly well to a noncontact velocimeter especially when the material would be adversely affected by contact velocity measurement. As an example, the measurement of the velocity of a web coated with a gelatinous material does not easily lend itself to contact velocity measurement.

In the above-mentioned examples not only is it important to know the magnitude of both the along-track and cross-track components of velocity but it is equally important to know the polarity of these components of the velocity. Without knowing the polarity of the components of velocity neither the true direction of travel nor any necessary direction-of-travel corrections can be made with speed or certainty. It is equally important to be able to determine when the relative velocity has ceased and what its value is when it is near zero.

SUMMARY OF THE INVENTION

This invention is an improvement over the above-noted patent to Flower et al. U.S. Pat. No. 3,432,237, the teaching of which is hereby incorporated by reference. In the above-noted patent a velocity measuring device is disclosed which uses reflected radiation passing through an optical grating to measure velocity. In one embodiment the outputs of two meters are fed to a computer to determine the along-track and drift angle or crosstrack component of motion. The polarity of these components of velocity is not determined and is assumed to be known. The improvement of the present invention provides a sign for these components and thereby enables a determination of the direction of movement to be made. Additionally, the zero and near-zero velocity conditions are measured with precision. In one embodiment a stationary grating and a rotating prism are used to create the frequency signals while in other embodiments the grating itself moves to create the frequency signals.

An object of the present invention is to provide a non-contact velocimeter which includes a measurement of cross-track movement and indicates the polarity of both along-track and cross-track velocities.

Another object of the invention is to provide a noncontact velocimeter which measures zero and near-zero velocities.

Another object of the invention is to provide an accurate noncontact velocimeter which is reliable and trouble-free in operation.

Further objects and advantages of the present invention will become apparent and the exact nature of the invention will be clearly understood when the following description is considered in conjunction with the drawings.

DESCRIPTION OF THE PREFERRED EMBODIMENTS

Figure 1:
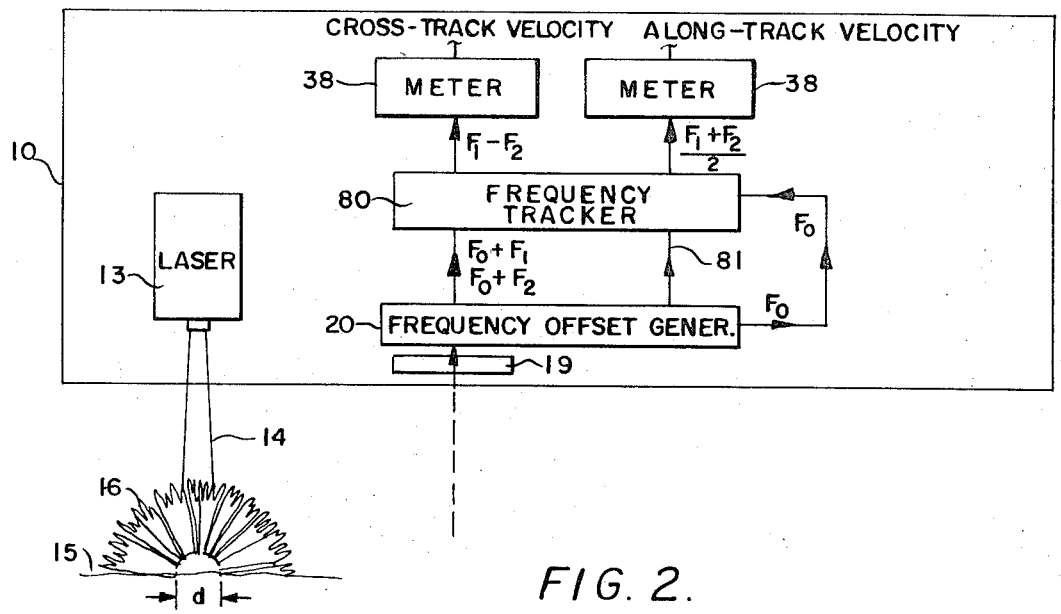
FIG. 1 is a schematic representation of one embodiment of the present invention.

FIG. 1 illustrates the velocimeter of the present invention mounted on a supporting structure generally indicated by a rectangle 10. A laser 13 or other monochromatic source of electromagnetic radiation projects a beam of radiation 14 toward a reflecting surface 15. If the supporting structure 10 is a vehicle, the reflecting surface 15 constitutes the terrain over which the vehicle is traveling. On the other hand, the reflecting surface 15 may constitute a traveling band or sheet of material, in which case the supporting structure 10 would constitute a fixed support. In any case the beam 14 irradiates the surface 15 over a finite area having a diameter $d$ and produces a back-scattered pattern 16. The backscattered pattern will be broad in extent if the reflecting surface 15 is non-specular and will be composed of lobes of random amplitude, width, and spacing. A discussion of the desirable bandwidth for optimum results is found in the patent to Flower et al. U.S. Pat. No. 3,432,237, columns 3 and 4. The receiving portion of the system, which is also mounted on the supporting structure 10, comprises a frequency offset generator 20, which generates frequency signals in response to the reflected radiation received. The reflected radiation from the backscattered pattern is received by the frequency offset generator through a filter 19, which serves to remove ambient light from the received radiation. These frequency signals are supplied to a frequency tracker 80. The frequency tracker 80 processes the frequency signals supplied and produces output signal voltages which represent the polarity and magnitude of the along-track and cross-track components of the relative velocity between the supporting structure 10 and the reflecting surface 15. These signal voltages are supplied to meters 38, which will indicate the values of the velocity components. Alternatively, the signal voltages can be supplied to a navigation computer.

Figure 2:
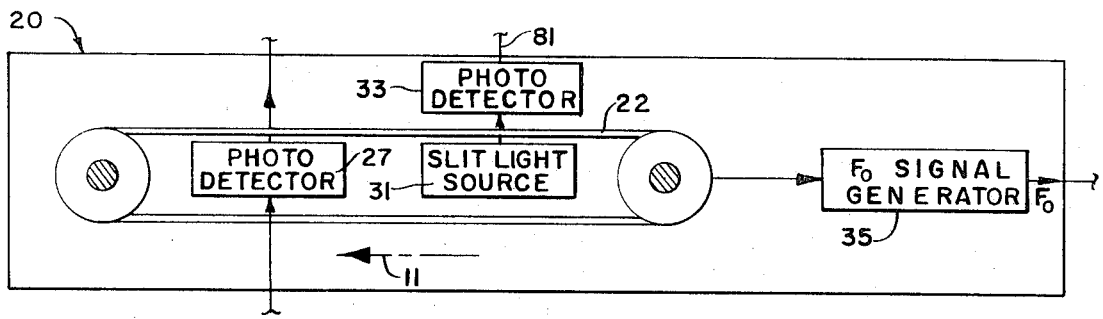
FIG. 2 is a schematic representation of an elevation of one embodiment of the frequency offset generator of FIG. 1.
Figure 3:
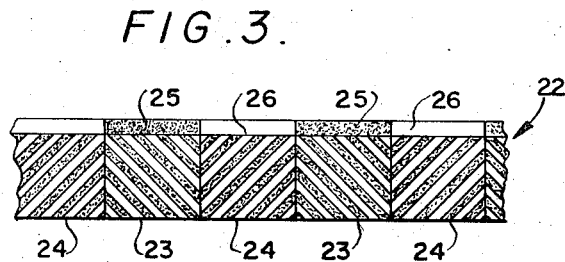
FIG. 3 is a partial plan view of the sectioned continuous grating strip of the frequency offset generator of FIG. 2.

FIG. 2 illustrates one embodiment of the frequency offset generator 20, which uses a moving sectioned grating strip 22 illustrated in partial plan view in FIG. 3. The continuous grating strip 22 which is in the form of an endless belt, is in continuous uniform motion in the direction of the along-track component of velocity to be measured indicated by arrow 11. The cross-track component of velocity is at right angles to the along-track component. The reflected radiation received by the frequency offset generator passes through one of the segments of the sectioned grating strip 22. These segments are composed of alternate transparent and opaque parallel lines so that they each form a grating. Although FIG. 3, for convenience of illustration, shows each grating strip segment as containing only a few lines, each segment being an optical grating will actually contain a large number of lines. A photodetector 27 is located within an annulus formed by the grating strip 22 and is adapted to receive light over a substantial area of the grating segment currently beneath the photodetector 27 so that the photodetector receives light through a relatively large number of transparent lines of the grating segment.

Because the grating segment currently beneath the photodetector 27 will be in motion relative to the backscattered pattern due to the motion of the structure 10 relative to the surface 15 and due to motion of the grating strip 22 relative to the structure 10, the amount of light passing from the backscattered pattern through the segment to the photodetector 27 will vary. This variation will be cyclical having a frequency corresponding to the rate that the transparent lines of the grating segment are moving past a point in the backscattered pattern. As a result the photodetector 27 will generate an output signal, which will have a frequency that corresponds to the rate that the transparent lines of the grating strip segment currently beneath the photodetector 27 move past a fixed point in the backscattered pattern. The frequency of the signal will have a component due to the movement of the grating strip 22 relative to the structure 10 and a component due to the relative movement of the structure 10 to the surface 15. If there were no relative motion between the supporting structure 10 and the reflecting surface 15, the frequency which is produced by the frequency offset generator 20 would depend solely upon the speed of the moving grating strip 22. This frequency is termed the offset frequency and is designated $F_0$.

The transparent and opaque lines of alternate segments of the grating strip are inclined at an angle relative to one another and to the direction of travel of the grating strip past the photodetector 27, or in other words to the along-track component of velocity to be measured. A typical value for this angle between the lines of the alternate segments is 90° and 45° to the direction of travel of the grating strip relative to the photodetector 27.

When there is relative motion between the supporting structure 10 and the reflecting surface 15, the frequency of the signals produced by the photodetector 27 will differ from $F_0$ by an amount depending on the relative velocity and the angle of the grating lines. When the relative velocity is aligned with the direction of motion of the grating strip 22, alternate sections of the belt produce the same frequency because the direction of motion of the alternate grating segments relative to the backscattered pattern will be at equal angles to the lines of the grating segments. The frequency generated by virtue of the passage of the reflected radiation through the belt sections 23 may be termed $F_0 + F_1$ and the frequency generated by virtue of the passage of the reflected radiation through the alternate belt sections 24 may be termed $F_0 + F_2$. Thus, $F_1$ and $F_2$ are components of the frequency signals due to the relative motion between the supporting structure 10 and the reflecting surface 15. Since the signal frequencies produced by the photodetector 27 may be above or below $F_0$, the values of $F_1$ and $F_2$ may be positive or negative. When the direction of the relative motion and the direction of the belt's travel are the same, the frequency from successive sections will be the same and $F_1$ will equal $F_2$. On the other hand, if there is a cross-track component of this relative velocity, the frequencies produced by the moving gratings will differ as successive sections pass beneath the photodetector 27 due to the difference in the orientation of the grating lines of the alternate sections relative to the velocity and accordingly $F_1$ will differ from $F_2$. From the values of $F_1$ and $F_2$ the along-track and cross-track components of the velocity can be determined. The component of velocity along the track will be proportional to $F_1 + F_2/2$. The cross-track component of velocity will be proportional to $F_1 - F_2$. The frequency signals $F_0 + F_1$ and $F_0 + F_2$ produced by the photodetector 27 alternately as the segments 23 and 24 pass under the photodetector 27 are termed velocity information signals. These signals are delivered to the frequency tracker 80 which operates upon them and produce signals representing the cross-track and along-track components in the manner described below.

Adjacent to each segment 23 in the grating strip 22 is an opaque bar 25 and adjacent to each segment 24 is a transparent bar 26. These bars are used to identify frequencies produced by the particular grating segment. The opaque bars 25 are thus associated with the frequency $F_0 + F_1$ and the transparent bars 26 are associated with the frequency $F_0 + F_2$. The opaque bars 25 produce what is termed for convenience a "left" signal and the transparent bars 26 produce what is termed a "right" signal. Enclosed within the annulus described by the rotating grating strip 22 is a slit light source 31 which directs a beam of light toward the strip of opaque and transparent bars 25 and 26. The light from the source 31 either illuminates or fails to illuminate a photodetector 33 placed on the opposite side of the moving grating strip 22 and arranged so as to produce a signal which is coordinated with the movement of the grating sections past the photodetector 27. This signal from the photodetector 33 is supplied to the frequency tracker 80 to be used in separating the velocity information signals received from photodetector 27 in a manner to be described below.

The frequency component $F_0$ is caused by the motion of grating strip 22 relative to the structure 10 and since the motion of the grating strip is at a constant speed, the frequency $F_0$ is correspondingly constant. The value of the offset frequency $F_0$ must be determined in order to determine the values of the frequency components $F_1$ and $F_2$, from which the components of velocity can be determined as explained above. While many methods may be used to determine the value of this offset frequency component $F_0$, the most accurate result is obtained if the moving belt 22 itself is made to generate a frequency signal equal to $F_0$. For this purpose an $F_0$ signal generator 35 is used. In this embodiment the $F_0$ signal generator comprises a light source, which directs light upon the grating segments of the moving grating strip 22, and a photodetector positioned to receive the resulting reflected light. The photodetector generates a signal which depends upon the speed of movement of the moving grating strip 22 and is equal to $F_0$. This offset signal is supplied to the frequency tracker 80 to be used as described below.

Figure 4:
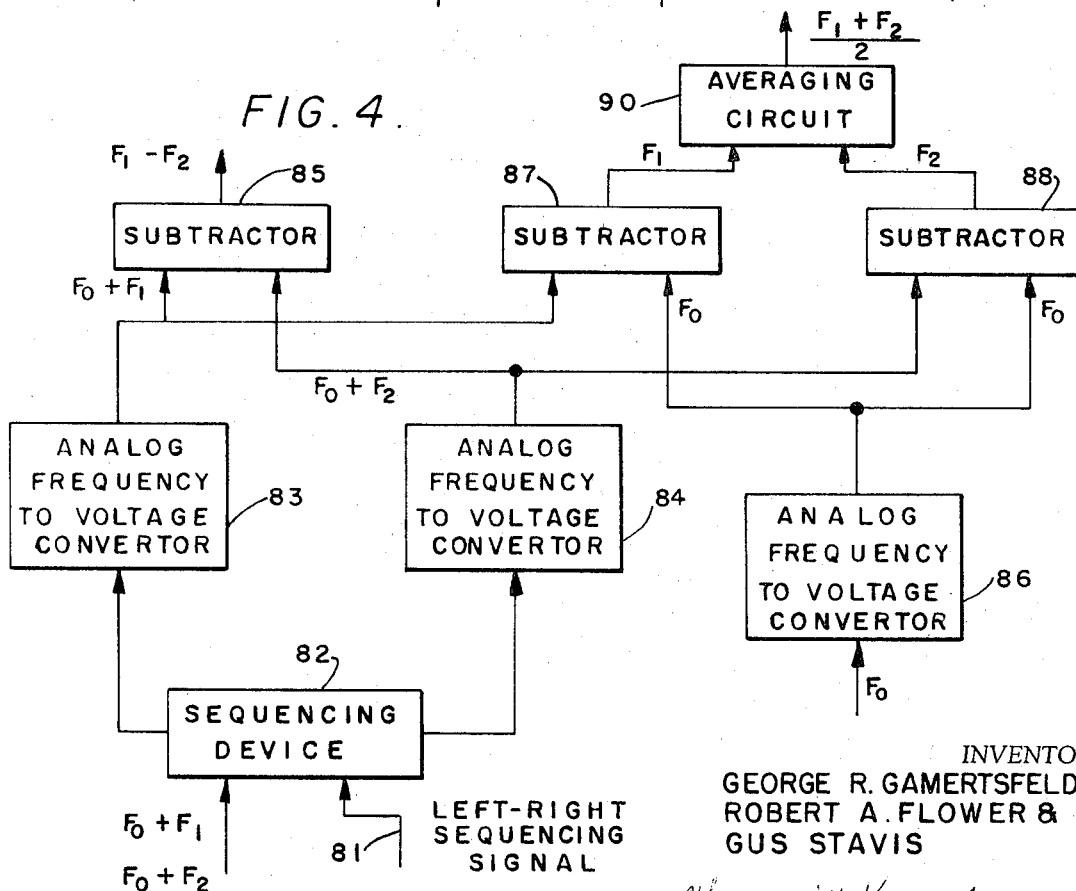
FIG. 4 is a block diagram of one embodiment of the frequency tracker of FIG. 1.

FIG. 4 illustrates one form of the frequency tracker 80 of FIG. 1. The frequency offset generator 20 supplies alternately on a single channel the velocity information signals $F_0 + F_1$ and $F_0 + F_2$. To separate these two signals, the output of the photodetector 33 on channel 81 is used. Whenever one of the segments 23 is under the photodetector 27, an opaque bar 25 will be between the photodetector 33 and the slit light source 31. Whenever one of the segments 24 is under the photodetector 27, a transparent bar 26 will be between the slit light source 31 and the photodetector 33. Thus the photodetector 33 will generate a left signal whenever a segment 23 is under the photodetector 27 and will generate a right signal whenever a segment 24 is under the photodetector 27. The left and right signals on channel 81 therefore indicate whether the photodetector 27 is receiving reflected radiation through a grating 23 or a grating 24.

A sequencing device 82 in the frequency tracker shown in FIG. 4 receives both the left and right signals and the velocity information signals $F_0 + F_1$ and $F_0 + F_2$ from the photodetector 27. The sequencing device 82, in response to left and right signals on channel 81, directs the $F_0 + F_1$ signal an analog frequency to voltage convertor 83 and the $F_0 + F_2$ signal to an analog frequency to voltage converter 84. These analog frequency to voltage convertors 83 and 84 convert the frequencies $F_0 + F_1$ and $F_0 + F_2$ respectively to voltage analogs. The convertors have time constants which are sufficiently large so that they include signals received from several segments of the moving sectioned continuous diffraction grating strip 22. The voltage analogs of the signals $F_0 + F_1$ and $F_0 + F_2$ are delivered to an analog subtraction circuit 85, which subtracts the voltage analog of $F_0 + F_2$ from the voltage analog of $F_0 + F_1$ to produce an output corresponding to $F_1 - F_2$ and representing the cross-track component of the relative velocity. This output may either be supplied to a suitably calibrated meter 38 or a navigation computer. The output signal produced by the subtraction circuit 85 represents by its polarity the polarity of the cross-track component of velocity.

The offset frequency signal $F_0$ is supplied to an analog frequency to voltage convertor 86 which converts the incoming frequency to a voltage analog. This voltage analog is then supplied to analog subtraction circuits 87 and 88 which also receive the signal voltages representing $F_0 + F_1$ and $F_0 + F_2$ respectively produced by the convertors 83 and 84. The subtraction circuits 87 and 88 subtract the signal representing $F_0$ from the signals representing $F_0 + F_1$ and $F_0 + F_2$ and supply the resulting signals representing $F_1$ and $F_2$ to an averaging circuit 90. The averaging circuit 90 operates on the incoming signals to produce a signal representing $F_1 + F_2/2$. This signal produced by the averaging circuit 90 represents the along-track component of the relative velocity. This along-track component signal is supplied either to a meter 38 or an appropriate navigation computer. The polarity of this signal will represent the polarity of the along-track component of velocity.

The above described system enables the accurate measurement of zero and near-zero relative velocity. Because of the use of a moving diffraction grating, zero and near-zero velocities will result in velocity information signals with frequencies which are readily measured. As a result, the accurate measurement of zero and near-zero relative velocity conditions can be carried out with ease.

Figure 5:
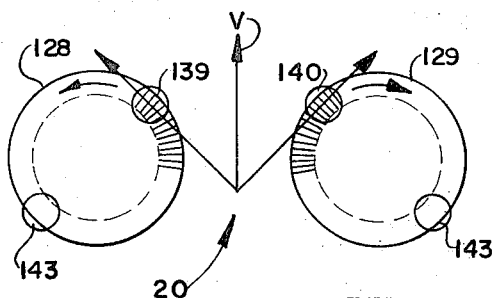
FIG. 5 is a plan view of a schematic representation of another embodiment of the frequency offset generator of FIG. 1.
Figure 6:
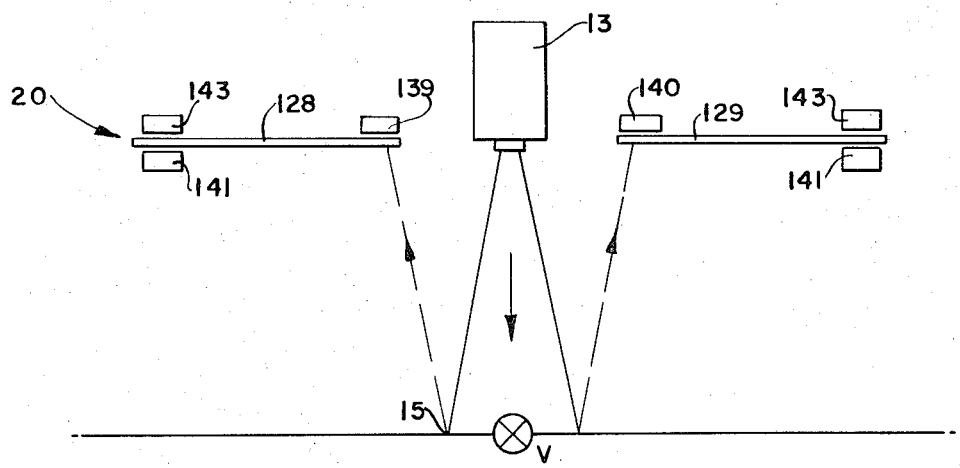
FIG. 6 is an elevation of the frequency offset generator of FIG. 5.

An alternate embodiment of the frequency offset generator 20 of FIG. 1 is shown in FIGS. 5 and 6 in which rotating radial gratings 128 and 129 are spaced with their axes equidistant from the source 13 of coherent light. Photodetectors 139 and 140 are positioned to receive light from the backscattered pattern reflected from surface 15 through portions of the radial gratings 128 and 129, respectively. The photodetectors 139 and 140 are equally spaced from the source 13 of coherent light to ensure equal reception of the reflected radiation by each of the photodetectors. The photodetectors 139 and 140 are placed so as to receive light through portions of the gratings where the grating lines are at 90° to one another and are at 45° to the alongtrack component of velocity to be measured. The direction of the along-track component is indicated in FIG. 5 by the arrow V.

In a manner similar to the above described sectioned continuous diffraction grating strip 22, the radial gratings 128 and 129 cause the photodetectors 139 and 140 to generate signals having frequencies which correspond to the rate that the grating lines move past fixed points in the backscattered pattern. As the embodiment illustrated in FIGS. 5 and 6 uses two separate gratings and two photodetectors receiving light from the backscattered pattern, signals on two separate channels are developed. The frequency of the signal generated by the photodetector 139 may be represented as $F_0 + F_1$ and the frequency of the signal generated by the photodetector 140 may be represented as $F_0 + F_2$. The component $F_0$ is the frequency that would be generated by each of the photodetectors 139 and 140 if there were no relative motion between the surface 15 and the structure containing the offset frequency generator shown in FIGS. 5 and 6. As in the case of the offset frequency generator of FIG. 2, the along-track component of velocity is represented by $F_1 + F_2/2$ and the crosstrack component of velocity is represented by $F_1 - F_2$. The signals from the frequency photodetectors 139 and 140 are separately sent to a frequency tracker and are there separately converted to the cross-track and along-track readings in a manner similar to that described above with respect to FIG. 4. Light sources 141 positioned beneath each of the rotating radial gratings 128 and 129 are directed to shine light beams through the gratings 128 and 129. These light beams are received by photodetectors 143, which generate offset frequency signals, each of which has a frequency $F_0$. These signals are supplied to the frequency tracker to be used in a similar manner to that described above with respect to FIG. 4.

Figure 7:
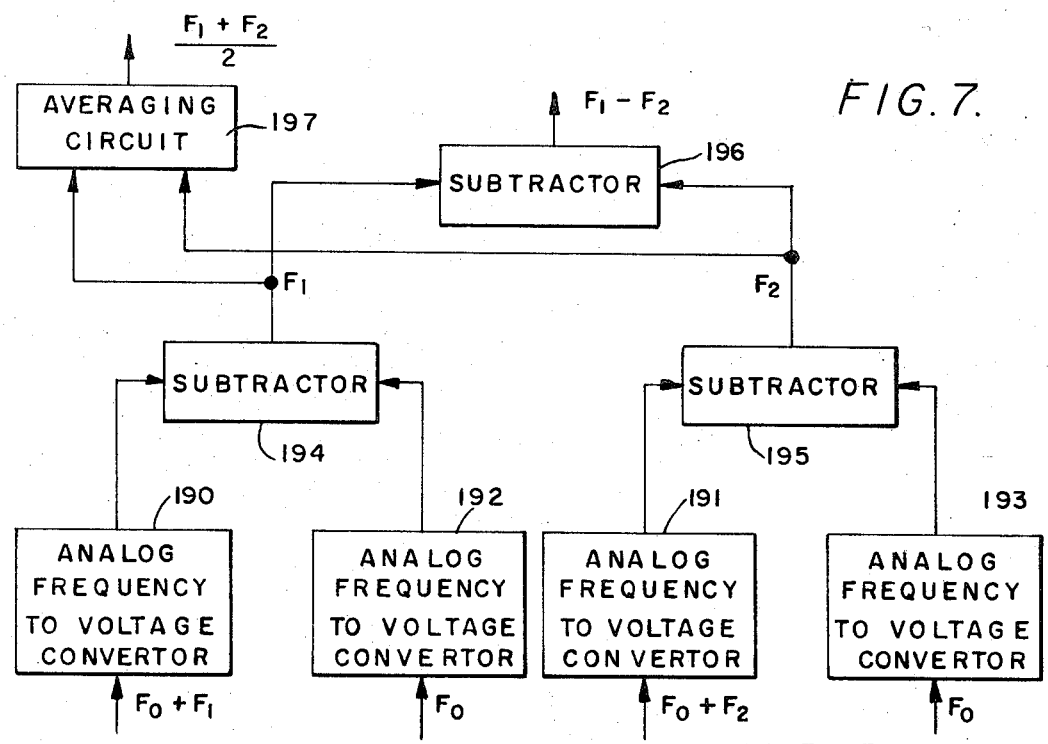
FIG. 7 is a block diagram illustrating a frequency tracker to be used with the frequency offset generator of FIGS. 5 and 6.

In the frequency offset generator illustrated in FIGS. 5 and 6, the velocity information signals $F_0 + F_1$ and $F_0 + F_2$ are generated simultaneously on separate channels. This is to be contrasted with the frequency offset generator shown in FIG. 2 which develops the velocity information signals $F_0 + F_1$ and $F_0 + F_2$ in sequence on one channel. As the frequency offset generator of FIG. 2 produces alternate signals from the sectioned continuous diffraction grating strip 22, a left-right sequencing signal and a sequencing device 82 are required in the frequency tracker to enable the frequency tracker to direct the proper signal to the appropriate analog converter 83 or 84. In the embodiment of FIGS. 5 and 6 neither a left-right sequencing signal nor a sequencing device is required and accordingly a modified frequency tracker shown in FIG. 7 is used. As shown in FIG. 7, the velocity information signals are supplied directly to analog frequency to voltage convertors 190 and 191, respectively.

As described above, the frequency offset generator of FIGS. 5 and 6 produces two offset frequency signals $F_0$, one from the grating 128 and the other from grating 129. These offset frequency signals are supplied to analog frequency to voltage convertors 192 and 193 respectively. The convertors 192 and 193 each produce voltage signals representing the offset frequency $F_0$. The output signal of the convertor 192 is derived from the grating 128 which also produces the $F_0 + F_1$ signal and the output signal of the convertor 193 is derived from the grating 129 which also produces the $F_0 + F_2$ signal. An analog subtraction circuit 194 subtracts the output signal of the convertor 192 from the output signal of the convertor 190 to produce an output signal representing $F_1$. An analog subtraction circuit 195 subtracts the output signal of the convertor 193 from the output signal of the convertor 191 to produce an output signal representing $F_2$. An analog subtraction circuit 196 subtracts the output signal of the subtraction circuit 195 from the output of the subtraction circuit 194 to provide an output signal representing $F_1 - F_2$ and representing the cross-track component of velocity. The output signals of the subtraction circuits 194 and 195 are supplied to an averaging circuit 197 which produces an output signal representing $F_1 + F_2/2$ and representing the along-track component of velocity.

Figure 8:
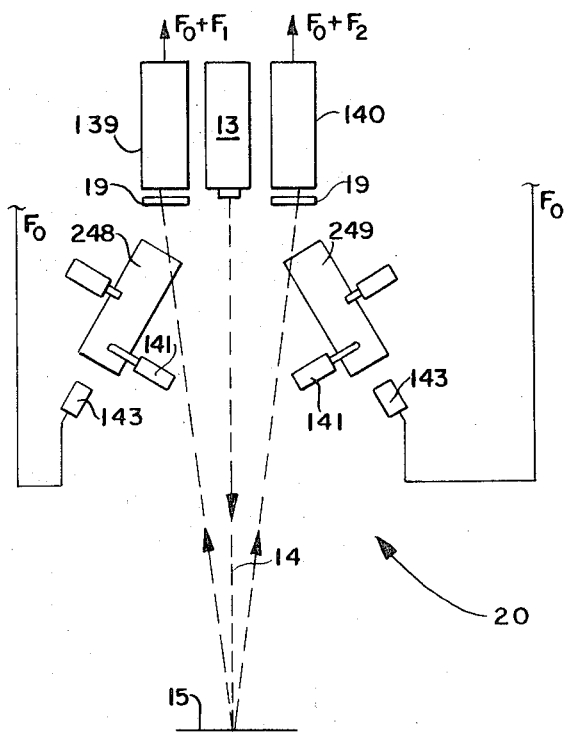
FIG. 8 is a perspective view schematically illustrating another embodiment of the frequency offset generator of FIG. 1.

FIG. 8 is a schematic representation of another embodiment of the frequency offset generator 20 of FIG. 1. In this embodiment gratings formed on rotating cylinders 248 and 249 are placed between the reflecting surface 15 and frequency photodetectors 139 and 140. The grating cylinders 248 and 249 are located equidistant from the laser-projected beam 14 and have their axes equally inclined so as to permit the reflected radiation to pass through a single wall of said grating cylinders 248 and 249. The reflected radiation then passes through filters 19 and impinges upon photodetectors 139 and 140. The grating lines are arranged on the cylinders 248 and 249 so that the projections in a horizontal plane of the grating lines in the areas through which the light from the backscattered pattern passes to the photodetectors 139 and 140 make an angle of 90° relative to one another and make an angle of 45° with the along-track component of velocity to be measured. The resultant signal generated by the photodetector 139 will be the velocity information signal $F_0 + F_1$ while the signal generated by the photodetector 140 will be the velocity information signal $F_0 + F_2$. These signals are supplied over separate channels to a frequency tracker of the type shown in FIG. 7. Additionally, adjacent to each of the grating cylinders 248 and 249 are light sources 141. These light sources 141 produce light which is directed through the gratings 248 and 249 to photodetectors 143, which produce offset frequency signals representing $F_0$. These offset frequency signals are supplied to the frequency tracker to be utilized to derive the along-track and cross-track components of velocity as described above with reference to FIG. 7.

Figure 9:
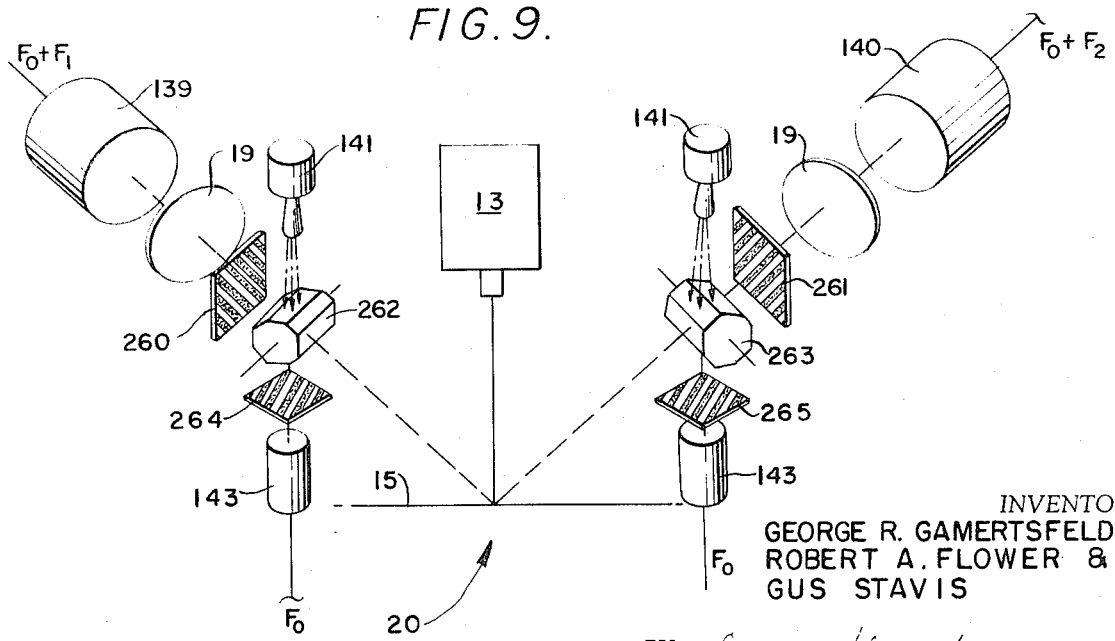
FIG. 9 is a perspective view schematically illustrating another embodiment of the frequency offset generator of FIG. 1.

The embodiment of the frequency offset generator 20 illustrated in FIG. 9 uses stationary gratings 260 and 261 and rotating glass prisms 262 and 263 through which the reflected radiation of the backscattered pattern passes. The reflected radiation obeying the principles of refraction is swept across the stationary diffraction gratings 260 and 261 by virtue of having passed through the rotating prisms 262 and 263. The reflected radiation, upon passing through the stationary diffraction gratings 260 and 261, impinges upon the photodetectors 139 and 140, which produce on separate channels velocity information signals having frequencies $F_0 + F_1$ and $F_0 + F_2$ respectively. Offset frequency signals, having frequency $F_0$, are generated in this embodiment by means of light sources 141, gratings 264 and 265, and photodetectors 143. Light from the light source 141 is swept by the rotating prisms 262 and 263 across the diffraction gratings 264 and 265. The light passing through the gratings 264 and 265 is received by photodetectors 143, which produces signals having the frequency $F_0$. The light sources 141 are arranged so as to project their light beams at an angle of 90° to the reflected radiation passing through the prisms 262 and 263 so as not to interfere therewith. The $F_0$ signals and the velocity information signals $F_0 + F_1$ and $F_0 + F_2$ are supplied to a frequency tracker of the type shown in FIG. 7.

Instead of using two prisms in the offset frequency generator, a single prism could be used in conjunction with two fixed segments of diffraction grating such as the segments 23 and 24 in FIG. 3. These two diffraction grating segments would be aligned so that the refracted reflected radiation would first sweep across one segment 23 and then across the other segment 24. The second segment would have its lines arranged at an angle to the first swept segment. This last mentioned type of arrangement would generate the velocity information signals $F_0 + F_1$ and $F_0 + F_2$ in sequence on a single channel and would necessitate the generation of a left-right sequencing signal to indicate when the reflected radiation is passing through which of the gratings.

Figure 10:
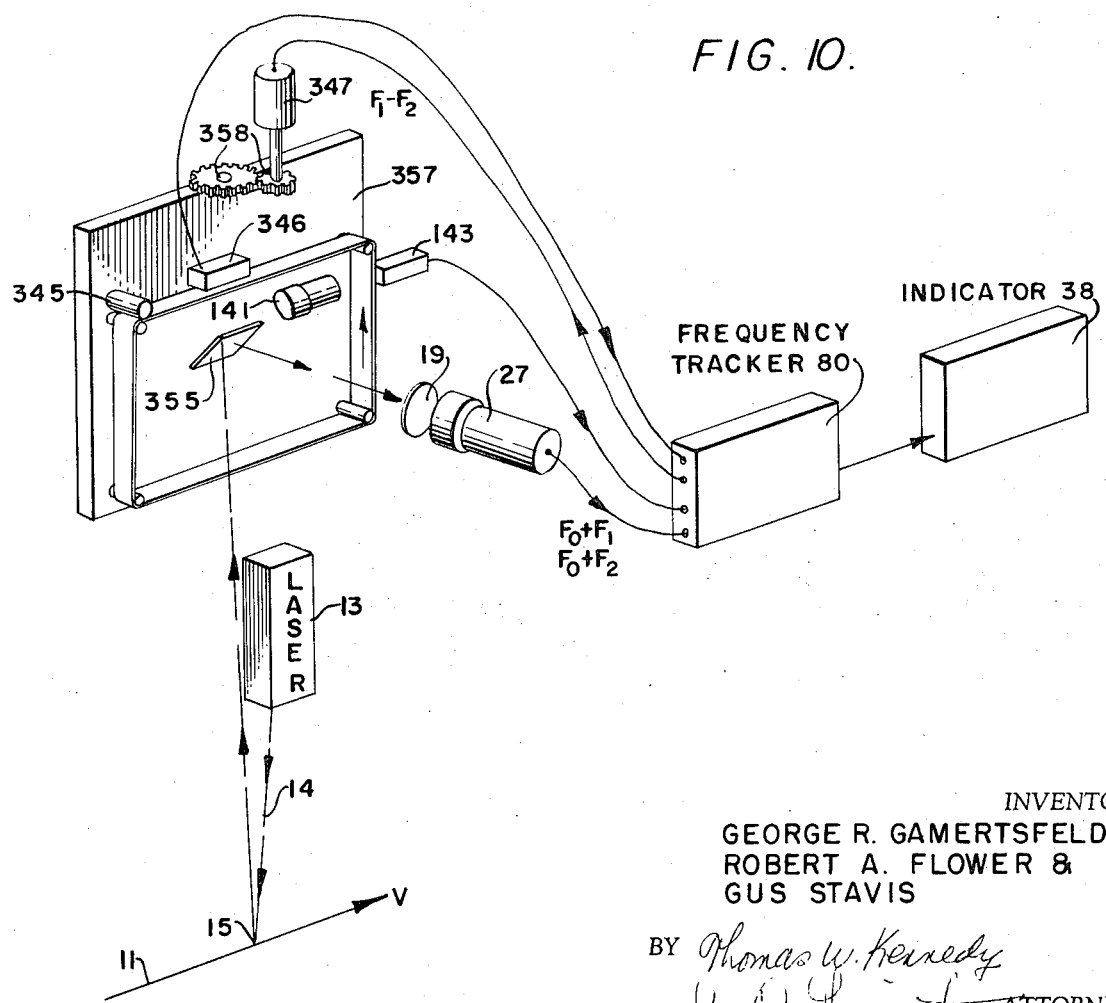
FIG. 10 is a block diagram of another embodiment of the velocimeter of the present invention.

The embodiment of the velocimeter illustrated in FIG. 10, unlike the other embodiments, supplies a single reading which gives the actual relative velocity instead of dividing it into cross-track and along-track components. The sectioned continuous diffraction grating strip 22 employed is maintained in constant motion by grating drive motor 345. The grating employed is of the type employed by the embodiment shown in FIGS. 2 and 3. A monochromatic source of electromagnetic radiation such as a laser 13 projects a beam of radiation 14 towards a reflecting surface 15. Backscattered radiation passes through the constantly moving sectioned continuous diffraction grating strip 22. This backscattered radiation is then reflected after striking mirror 355 and after passing through filter 19 impinges upon a photodetector 27. The photodetector 27 generates velocity information signals $F_0 + F_1$ and $F_0 + F_2$ alternately on a single channel. These signals are supplied to the frequency tracker 80. Additionally, placed within the annulus formed by the sectioned continuous diffraction grating strip 22 is a light source 141. This light source 141 projects a beam of light through said sectioned continuous diffraction grating strip 22 to a photodetector 143. The moving grating 22 thus causes a variation in the amount of light reaching the photodetector 143 and the photodetector 143 generates a signal with the frequency $F_0$. This signal is also supplied to the frequency tracker 80. Further, located in close proximity to the sectioned continuous diffraction grating strip 22 is a left-right sequencing signal generator 346 which operates in a similar manner to the sequencing signal generator of FIG. 2. The sequencing signal generator 346 is arranged to detect light passing through the opaque and transparent bars, 25 and 26 illustrated in FIG. 3 of the sectioned continuous diffraction grating strip 22 and generates left and right signals which are supplied to the frequency tracker 80. Frequency tracker 80 may be the same as that shown in FIG. 4 and generates output signals representing $F_1 + F_2/2$ and $F_1 - F_2$. The signal representing $F_1 + F_2/2$ is supplied to a frequency meter 38 which indicates the magnitude of the relative velocity as in hereinafter explained.

In this embodiment the along-track component is in the direction that bottom portion of the strip 22 moves, and the cross-track component is at 90° to this direction. The signal which represents the cross-track velocity $F_1 - F_2$ is supplied to an azimuth drive 347. This azimuth drive 347 turns a platform 357 to which the moving sectioned continuous diffraction grating strip 22 and associated mechanism are attached, by means of suitable gearing 358. As the platform 357 is turned by azimuth drive, the direction that the strip 22 is moving changes and accordingly the values of $F_1$ and $F_2$ change. The azimuth drive 347 turns the platform 357 in response to the $F_1 - F_2$ output signal of the frequency tracker in a direction to reduce the value of $F_1 - F_2$ and will turn the platform until $F_1 - F_2$ is zero. At this point the signals $F_1$ and $F_2$ will be equal, and the azimuth drive 347 stops turning the platform 357. The output signal of the frequency tracker 80 indicated by the indicator 38 represents the magnitude of the relative velocity between the supporting structure and the reflecting surface 15. The direction of the relative velocity will be the direction that grating strip 22 is traveling. This direction may be indicated by the use of suitable circuitry to measure the angular displacement of the platform 357 from a predetermined normal position.

An alternate method for providing the offset signal $F_0$ in any of the above described embodiments would be to drive the moving diffraction gratings or moving prisms with a constant speed drive synchronously connected to an oscillator which generates $F_0$. Still another alternative method for generating the offset signal $F_0$ would be to connect an AC tachometer to the shaft which drives the moving grating or prism.

Instead of converting the frequency signals to analog signals and then performing the arithmetic operations to determine $F_1$ and $F_2$, the signals may be left in frequency form and the arithmetic operations may be carried out digitally by means of binary counters and binary logic circuitry.

While several embodiments of the invention have been shown and described for illustration purposes, many changes may be made in the system design without departing from the spirit and scope of the invention.

What is claimed is:

1. A velocimeter comprising
   a source of coherent radiation directed to irradiate a surface from which the relative velocity is to be measured,
   receiving means to receive the resulting reflection of coherent radiation from said surface including first and second gratings and detecting means responsive to the intensity of the received radiation passing through said gratings to produce respectively first and second velocity information signals,
   translating means to provide relative motion between both of said gratings and the reflected coherent radiation received by said receiving means, said translating means moving said gratings in sequence through the path of said received reflected coherent radiation to said detecting means photodetector,
   the lines of said first and second gratings being at an angle to one another where the received reflected coherent radiation passes through said gratings,
   offset frequency generating means operatively associated with said gratings to generate a signal having a frequency equal to the frequency of the signals that would be generated by said detecting means if there were no relative velocity between said detecting means and said surface,
   first subtractor means coupled to said first and second velocity information signals to provide an output signal indicative of the cross track velocity between said radiation source and said reflecting surface,
   second subtractor means coupled to said first velocity information signal and said offset frequency to provide an output signal indicative of the velocity between said first grating and said reflecting surface,
   third subtractor means coupled to said second velocity information signal and said offset frequency to provide an output signal indicative of the velocity between said second grating and said reflecting surface, and
   averaging means coupled to receive said output signal of said second and third subtractor means to provide an output signal indicative of the along track velocity between said source of radiation and said reflecting surface.

2. A velocimeter as recited in claim 1 wherein said translating means comprises drive means to move said gratings relative to said detecting means.

3. A velocimeter as recited in claim 2 wherein said detecting means comprises a photodetector positioned to detect said received reflected coherent radiation.

4. A velocimeter as recited in claim 3 wherein said gratings are part of a strip of said gratings arranged in sequence and wherein said drive means comprises means to advance said strip past said photodetector to move said gratings in sequence past said photodetector.

5. A velocimeter as recited in claim 4 wherein said strip of gratings is in the form of an endless belt.

6. A velocimeter as recited in claim 1 wherein said detecting means comprises a first photodetector positioned to detect said received reflected coherent radiation passing through said first grating and a second photodetector positioned to detect said received reflected coherent radiation passing through said second grating.

7. A velocimeter as recited in claim 6 wherein said first and second gratings are defined as radial grating lines on discs and wherein said translating means comprises means to rotate said discs on the axes thereof past said first and second photodetectors.

8. A velocimeter as recited in claim 6 wherein said first and second gratings are defined on cylindrical shells oriented so that said received light passes through one wall of each of said shells to said photodetectors, and wherein said translating means comprises means to rotate said cylindrical shells on the axes thereof.

9. A velocimeter as recited in claim 1 wherein said translating means comprises means to sweep said received reflected coherent radiation across said first and second gratings.

10. A velocimeter as recited in claim 9 wherein said means to sweep said received reflected coherent radiation comprises a rotating prism.

11. A velocimeter as recited in claim 1 further comprising means responsive to the frequency of the output signals of said detecting means to generate a first signal representing the component of the relative velocity of said detecting means to said surface along a first axis fixed relative to the direction of motion provided by said translating means and a second signal representing the component of said relative velocity along a second axis perpendicular to said first axis, and means responsive to said second signal to change the direction of the relative motion provided by said translating means to reduce said second output signal to zero whereby said first axis is in the direction of said relative velocity and the signal representing the component of said relative velocity along said first axis represents the magnitude of said relative velocity.

* * * * *